United States Patent [19]

Iino et al.

[11] Patent Number: 5,780,955
[45] Date of Patent: Jul. 14, 1998

[54] ULTRASONIC MOTOR DEVICE

[75] Inventors: Akihiro Iino; Masao Kasuga; Makoto Suzuki; Kenji Suzuki; Tomosumi Saruwatari, all of Chiba, Japan

[73] Assignee: Seiko Instruments Inc., Japan

[21] Appl. No.: 723,114

[22] Filed: Sep. 30, 1996

[30] Foreign Application Priority Data

Oct. 2, 1995 [JP] Japan .................................. 7-255269
Aug. 29, 1996 [JP] Japan .................................. 8-228750

[51] Int. Cl.$^6$ ........................................... H01L 41/08
[52] U.S. Cl. .......................... 310/316; 310/323; 318/116
[58] Field of Search ............................. 310/316, 319, 310/317; 318/116

[56] References Cited

U.S. PATENT DOCUMENTS

| | | | |
|---|---|---|---|
| 5,101,144 | 3/1992 | Hirotomi | 318/116 |
| 5,365,139 | 11/1994 | Kasuga et al. | 310/316 |
| 5,461,273 | 10/1995 | Kawasaki et al. | 310/316 |
| 5,619,089 | 4/1997 | Suzuki et al. | 310/316 X |

FOREIGN PATENT DOCUMENTS 0650252  4/1995  European Pat. Off.

*Primary Examiner*—Mark O. Budd
*Attorney, Agent, or Firm*—Adams & Wilks

[57] ABSTRACT

An ultrasonic motor device comprises a vibrating member, a moving member movably disposed on the vibrating member and driven by vibration of the vibrating member, and a pressure regulating member for urging the moving member into pressure contact with the vibrating member. A self-excited vibration circuit has a piezo-electric element having a first surface supporting at least one group of electrodes and a second surface supporting the vibrating member to be vibrationally driven by the piezo-electric element, an amplifying circuit for receiving a voltage generated on the second surface of the piezo-electric element and amplifying the received voltage to a predetermined voltage level, and a boosting circuit for boosting an output voltage of the amplifying circuit and applying the boosted output voltage to the group of electrodes of the piezo-electric element to vibrationally drive the vibrating member.

22 Claims, 8 Drawing Sheets

ULTRASONIC MOTOR DEVICE

BACKGROUND OF THE INVENTION

The present invention relates to an ultrasonic motor device for friction-driving a moving body by an oscillating wave generated on the vibrating body to which piezo-electric elements are joined, and particularly relates to a new technique for driving an ultrasonic motor device.

Figure 12:
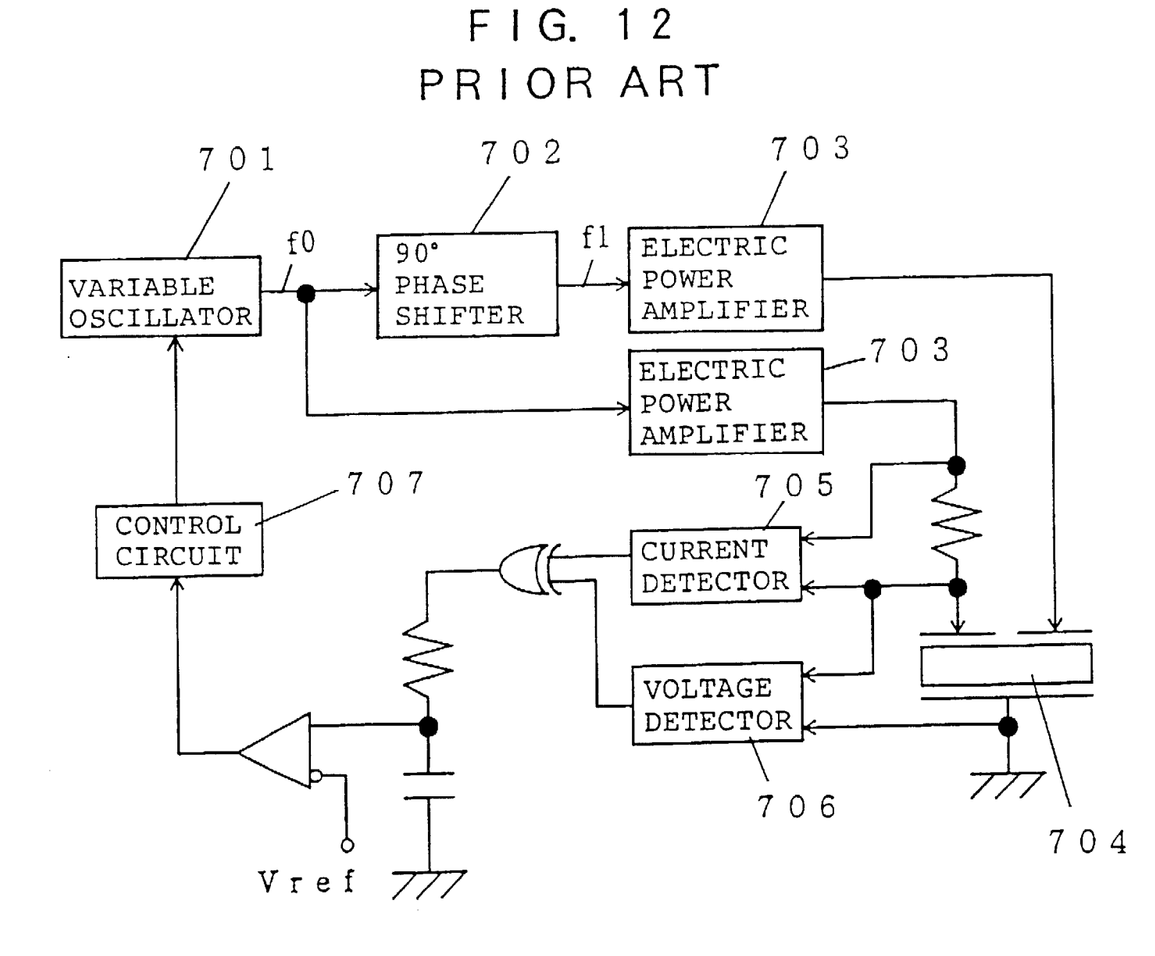
FIG. 12 is a block diagram showing a construction of a conventional ultrasonic motor device.

Conventionally, as shown in FIG. 12, there has been known an ultrasonic motor device for driving a moving body contacted to an vibrating body at a predetermined pressure by a progressive wave generated on the vibrating body by applying a driving signal f0 of a predetermined frequency and a driving signal f1 shifted in phase by 90° by a 90° phase shifter 702 to a piezo-electric element 704 joined to the vibrating body through an electric power amplifier 703, respectively. For example, there is disclosed such a construction in the gazette of Japanese Patent Laid Open (Kokai) No. 62-92781.

However, in case of the conventional progressive wave type ultrasonic motor device, in order to rotate the moving body, two high frequency voltages different in phase from each other are applied to the piezo-electric element 704, so that the oscillation of the progressive wave needs to be generated on the vibrating body. Therefore, there is required a driving circuit comprising two of said electric power amplifying circuits 703.

Further, since the oscillation characteristics of the vibrating body change due to the change of the environmental temperature or the driving voltage, the drive must be carried out while detecting and controlling the drive parameters such as applied voltage, frequency, and phase to follow the change of the environment, by a current detector 705, a voltage detector 706, a control circuit 707, etc. Therefore, the driving circuit becomes complicated.

Further, the electric power source requires a capacity large enough to operate the driving circuit. Accordingly, it is difficult to lower the voltage and the electric power of the electric source.

As described above, there is a problem that the driving circuit is complicated, further requires the befitting electric source, although the ultrasonic motor device has a simple construction. Furthermore, there is a problem that it is difficult to apply an ultrasonic motor device to the electronic equipment, subject to miniaturization.

SUMMARY OF THE INVENTION

It is an object of the present invention to provide an ultrasonic motor device which realizes a stable operation, a simple driving system, and has a satisfactory environmental reliability, in order to solve the above-mentioned problems.

In order to solve the above-mentioned problems, the present invention realizes an ultrasonic motor device having a vibrating body to which a piezo-electric element is joined, the ultrasonic motor device for friction-driving a moving body by an oscillating wave generated on the vibrating body due to a telescopic movement of the piezo-electric element, wherein the ultrasonic motor device comprises a pressing means arranged so as to bring the moving body into pressure-contact with the vibrating body, a piezo-electric element, having a surface on which at least one electrode group comprising a plurality of electrodes is formed, an amplifying circuit for receiving a voltage generated on the other surface of the piezo-electric element and amplifying the received voltage to a predetermined voltage level, and a boosting circuit for boosting an output voltage of an amplifying circuit and oscillating-driving the electrode group formed on the piezo-electric element. By this construction, an ultrasonic motor is realized having a stable operation by a simple driving system, and having a satisfactory environmental reliability.

DETAILED DESCRIPTION OF THE PREFERRED EMBODIMENTS

Embodiments of an ultrasonic motor device according to the present invention will be described with reference to the drawings.

Figure 1:
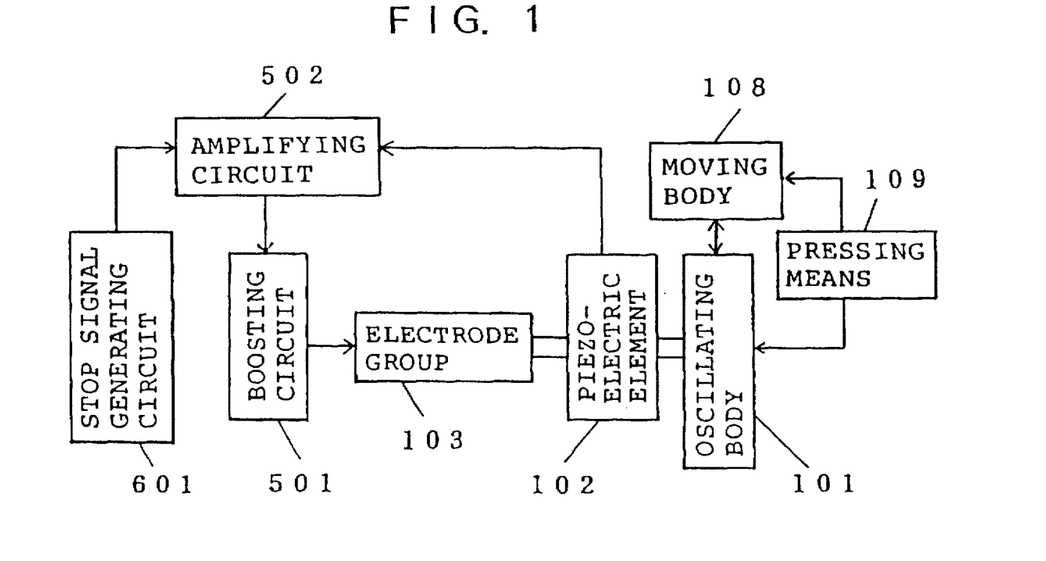
FIG. 1 is a block diagram showing an embodiment of an ultrasonic motor device according to the present invention.

In FIG. 1, at least one electrode group 103 comprising a plurality of electrodes is formed on a surface of a piezo-electric element 102. The electrode group 103 is driven by a boosting circuit 501. An oscillating or vibrating body 101 is joined to the other surface of the piezo-electric element 102 which is excitation-driven, and the vibrating body 101 serves as an electrode also.

The piezo-electric element 102 and the vibrating body 101 serve as a mechanical filter. A signal mainly comprising a resonant frequency is generated on the vibrating body 101. This signal is amplified by an amplifying circuit 502, and inputted to a boosting circuit 501. The signal boosted by the boosting circuit 501 is applied to the electrode group 103, to thereby vibrationally drive the piezo-electric element 102. The driven signal applied to the electrode group 103 is feedback-controlled by the amplifying circuit 502 and the boosting circuit 501, so that the piezo-electric element 102 carries out the self-excited oscillation. As a result, the vibrating body 101 adhered to the piezo-electric element 102 is oscillated, and then a moving body 108 contacted to the vibrating body 101 at a predetermined pressure by a pressing means 109 is rotated.

A stop signal generating circuit 601 aims to control the operation of the amplifying circuit 502, the amplifying circuit 502 stops the outputting by the stop signal, and the piezo-electric element 102 stops the self-excited oscillation. Accordingly, the moving body 108 can optionally be stopped from rotating.

Figure 2:
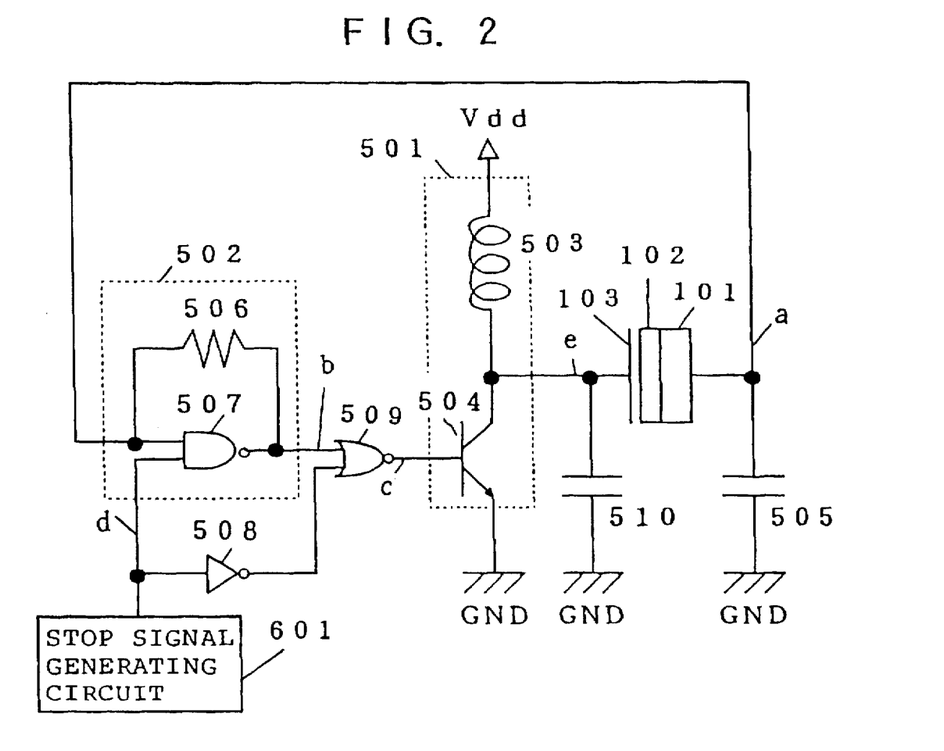
FIG. 2 is a first concrete circuit of an ultrasonic motor device according to the present invention.

FIG. 2 shows a concrete circuit construction of a first embodiment of an ultrasonic motor device according to the present invention.

At least one set of the electrode group 103 comprising a plurality of electrodes is formed on one surface of the piezo-electric element 102, and the vibrating body 101 is joined to the other surface thereof by means of the adhesion, etc. The vibrating body 101 serves as an electrode also, and is coupled electrically to the amplifying circuit 502 and a condenser 505. The other end of the condenser 505 is grounded (GND).

The amplifying circuit 502 is constituted by a NAND gate 507 and a resistor 506, and carries out the reversed amplifying operation. A signal from the vibrating body 101 is inputted to an input terminal of the NAND gate 507. A signal from the stop signal generating circuit 601 is inputted to the other input terminal of the NAND gate 507. This signal is of a HIGH level in a normal operation condition, and the amplifying circuit 502 ensures the reversed amplifying operation. The resistor 506 determines the operation point at which the NAND gate 507 ensures the amplifying operation.

The signal mainly comprising a resonant frequency, generated on the vibrating body 101 is amplified up to the electric source voltage by the amplifying circuit 502. The output of the amplifying circuit 502 is inputted to a NOR gate 509. The NOR gate 509 aims to adjust the phase of the signal, and inverts the input signal to output it when the output of the stop signal generating circuit 601 is of a HIGH level.

The output of the NOR gate 509 is coupled to a base of an NPN type transistor 504. The emitter of the transistor 504 is grounded, the collector thereof is coupled to the boosting coil 503, the electrode group 103, and a condenser 510. The transistor 504 and the boosting coil 503 constitute the boosting circuit 501. The boosting circuit 501 boosts inversely the output signal of the NOR gate 509, thereby vibrationally driving the piezo-electric element 102.

The amplifying circuit 502, the phase adjusting NOR gate 509, the boosting circuit 501, and the phase adjusting condensers 505, 510 constitute a feedback group. Then, the signal mainly comprising a resonant frequency generated on the vibrating body 101 becomes a driving signal which is boosted inversely by the feedback group, and the piezo-electric element carries out the continuous and stable self-excited oscillation.

By selecting the boosting coil suitably, the piezo-electric element can be vibrationally driven by a voltage which is several times that of the electric source voltage. Therefore, even if the electric source is a silver battery of 1.5 V, the output of the boosting circuit is 3 to 6 V, which results in the stable rotational driving of the ultrasonic motor.

On the other hand, when the signal from the stop signal generating circuit 601 is of a LOW level, the output of the amplifying circuit 502 is kept to be of a HIGH level. Further, since the stop signal is also inputted to the NOR gate 509 through the inverter 508, the output of the NOR gate is always of a LOW level when the output of the stop signal generating circuit 601 is of a LOW level. Then, the above-mentioned feedback group is interrupted, so that the piezo-electric element 102 stops oscillating. Therefore, the suitable control of optional stopping of signal generating circuit 601 enables to stop the rotation of the ultrasonic motor.

Figure 3:
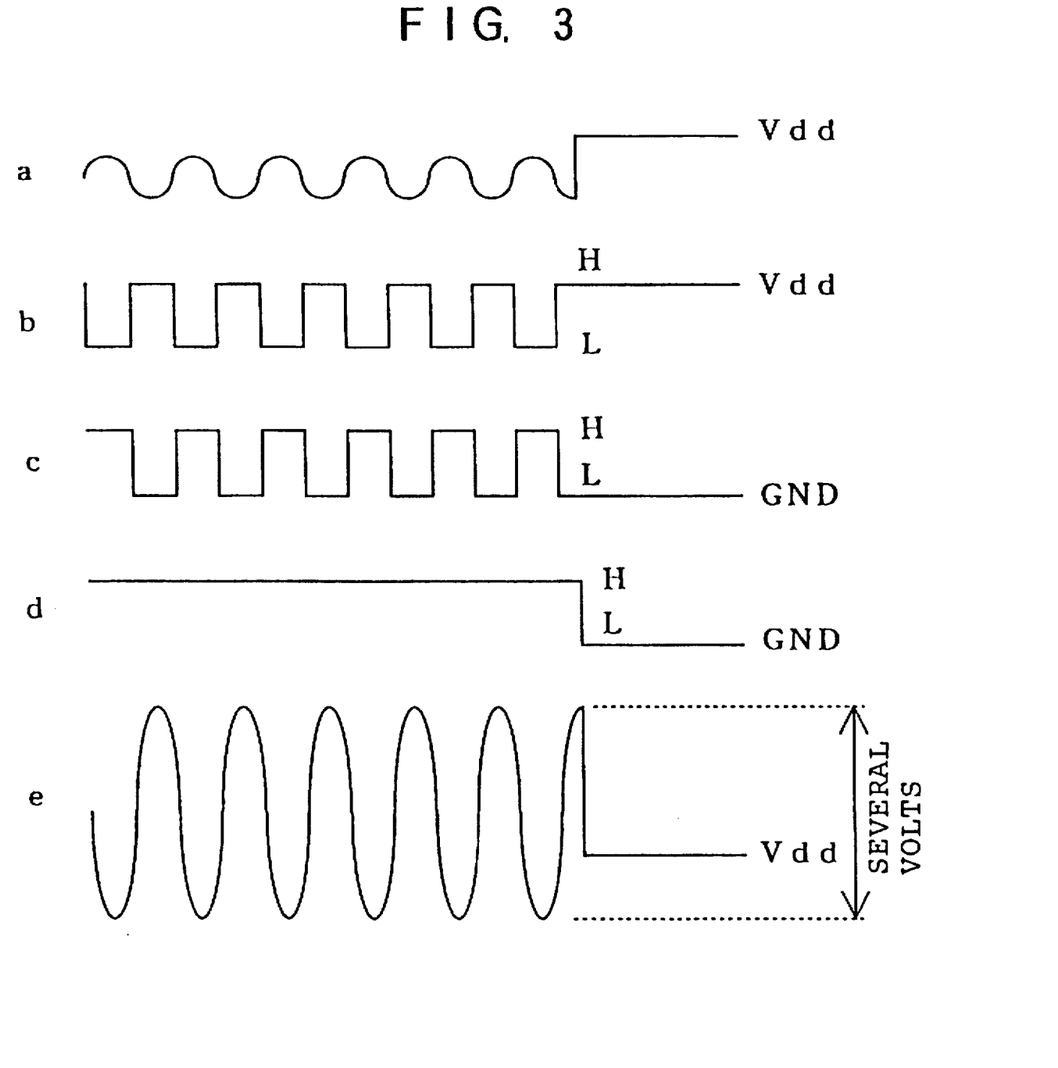
FIG. 3 is an explanatory view showing signal waves of respective portions of the first circuit of the ultrasonic motor device in FIG. 2.

FIG. 3 shows the signals for the respective points in FIG. 2. The signal a is a signal mainly comprising a resonant frequency generated on the vibrating body 101. The signal a is inputted to the amplifying circuit 502, and the amplifying circuit 502 outputs a signal b of a rectangular wave. The NOR gate 509 inputs signal b and outputs a signal c which is inverted in phase, then turns on/off the NPN type transistor 504. The turning on/off of the NPN type transistor 504 generates a counter electromotive voltage e of several volts to the boosting coil 503. The signal a and the counter electromotive voltage e are substantially inverted in phase, whereby the piezo-electric element 102 carries out the self-excited oscillation. The signal d is a signal from the stop signal generating circuit 601. When the signal d achieves a LOW level, the signal b achieves a HIGH level, and the signal c achieves a LOW level, whereby the self excited-oscillation is stopped.

Figure 4:
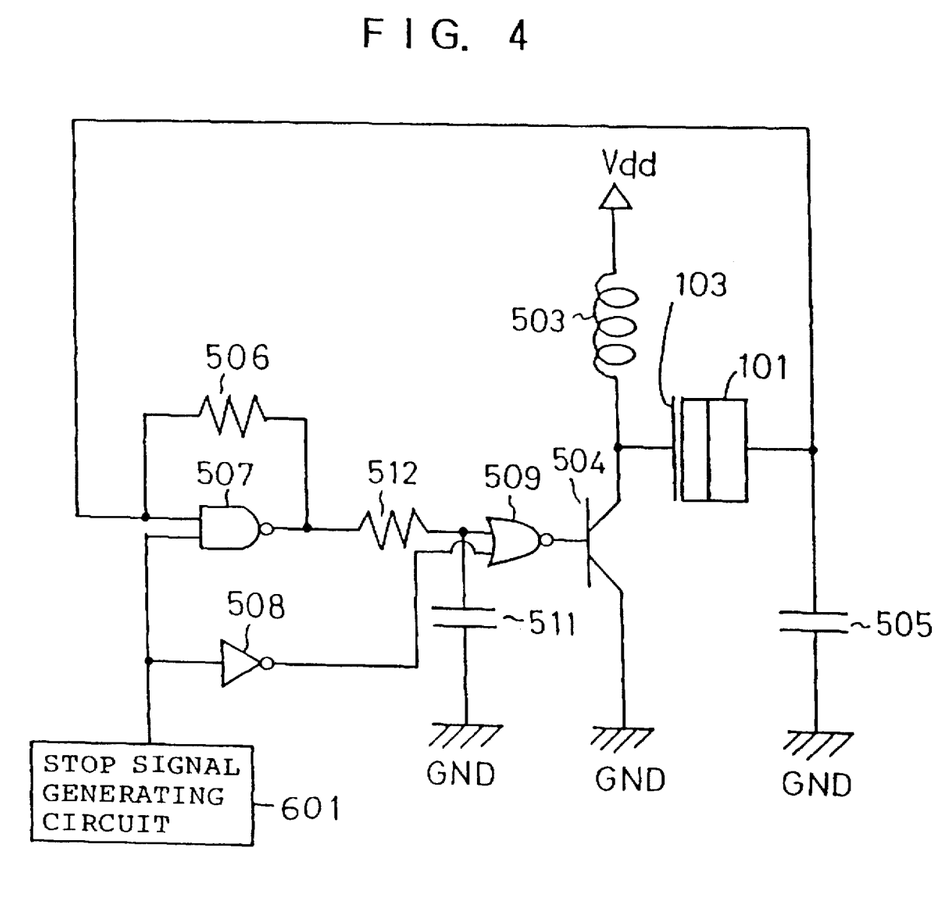
FIG. 4 is a second concrete circuit of an ultrasonic motor device according to the present invention.

FIG. 4 shows a concrete circuit construction of a second embodiment of an ultrasonic motor device according to the present invention. Only the different points from those of the circuit construction of the first embodiment will be described.

In FIG. 4, one end of the phase adjusting condenser 511 is coupled to a portion between the amplifying circuit 502 and the phase adjusting NOR gate, and the other end thereof is grounded (GND). The condenser 511 constitutes a low pass filter in association with a resistor 512, which is capable of adjusting the phase. Moreover, the circuit can be operated without the resistor 512.

According to the above-mentioned circuit construction, the amplifying circuit 502, the phase adjusting NOR gate 509, the boosting circuit 501, and the phase adjusting condenser 511, 505 constitute a feedback group. Then, the signal mainly comprising a resonant frequency generated on the vibrating body 101 becomes a driving signal which is boosted inversely by the feedback group, and the piezo-electric element carries out the continuous and stable and self-excited oscillation.

Figure 5:
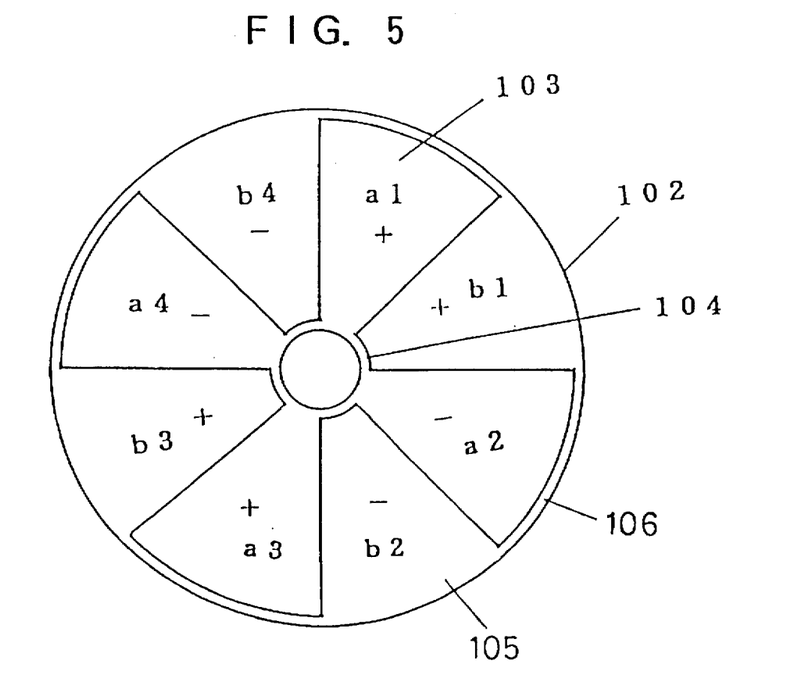
FIG. 5 is a first constitutional view of electrodes disposed on a surface of a piezo-electric element of an ultrasonic motor device according to the present invention.

FIG. 5 is a plan view of a piezo-electric element of the first embodiment of the ultrasonic motor device according to the present invention, which shows a polarizing treatment and the construction of the electrode. The present embodiment is directed to a case in which the moving body 108 is driven by exciting the stationary wave of two wavelengths in a circumferential direction of the vibrating body 101.

One surface of the piezo-electric element 102 is divided equally into eight of fan-shaped portions which is four times the number of waves in the circumferential direction, thereby forming fan-shaped electrodes alternately. In the drawing, the electrodes are formed at portions a1, a2, a3 and a4, and these constitute the electrode group 103. The respective electrodes of the electrode group 103 are short-circuited by wiring means 104. Further, as shown in the drawing, they are subjected to the polarizing treatments (+) and (−). The symbols (+) and (−) denote the direction of the polarizing treatment, respectively. The polarizing treatment is carried out by applying a positive electric field and a negative electric field to a joint surface of the piezo-electric element 102 to the vibrating body 101. The polarizing treatment subjected on the electrodes are inverted in direction alternately, e.g. + for a1, − for a2, + for a3, − for a4. The vibrating body 101 is joined to a rear surface of the piezo-electric element 102.

Moreover, as the piezo-electric element, a plurality of fan-shaped piezo-electric elements are arranged and adhered in a disk-like shape on the vibrating body in place of the electrodes in which the disk is divided equally at regular intervals.

Figure 6:
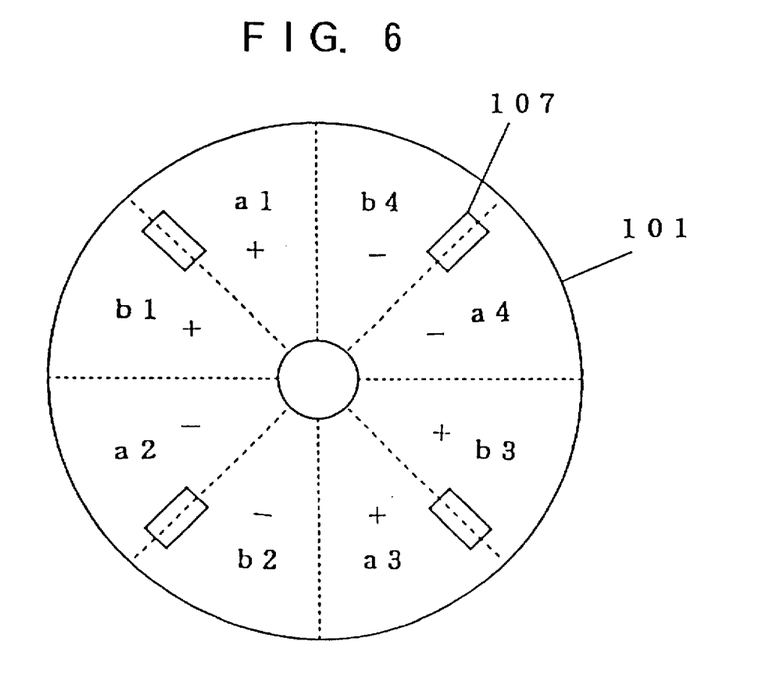
FIG. 6 is a first plan view of a vibrating body of the ultrasonic motor device according to the present invention.
Figure 7:
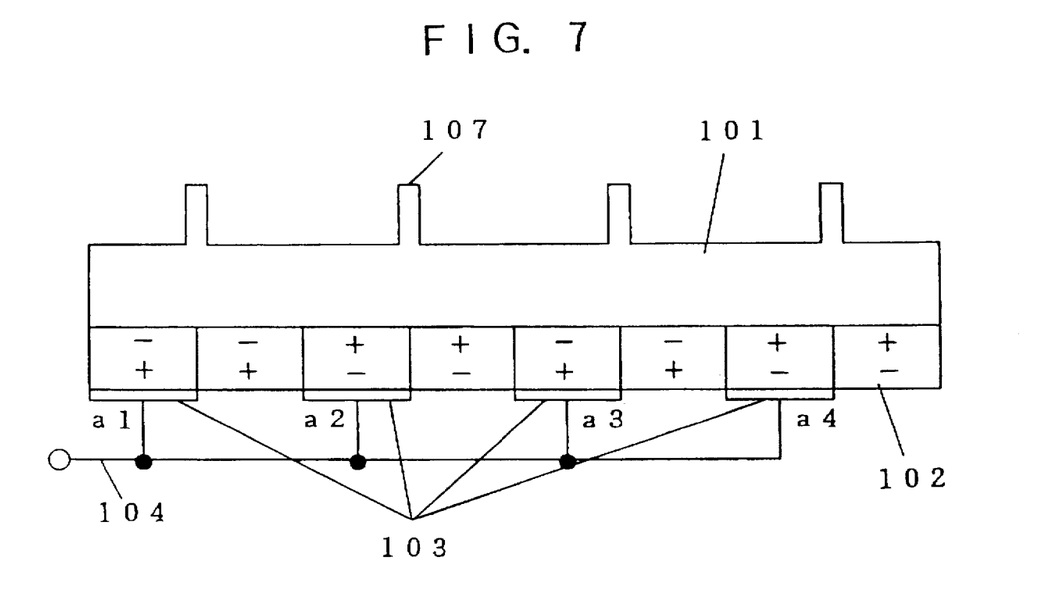
FIG. 7 is a first sectional view of the vibrating body of the ultrasonic motor device according to the present invention.

FIG. 6 and FIG. 7 are a plan view and a longitudinal sectional view of the vibrating body of the first embodiment according to the present invention, respectively. The piezo-electric element 102 of a disk-like shape is adhered to a plane of the vibrating body 101 of a disk-like shape, or joined thereto by a membrane forming means, etc. Protrusions 107 for transmitting the power to the moving body 108 are disposed on the surface of the vibrating body 101. The protrusions 107 are arranged at regular intervals so as to correspond to one side of the fan-shaped electrode of the piezo-electric element 102 joined to the rear surface thereof.

Figure 8:
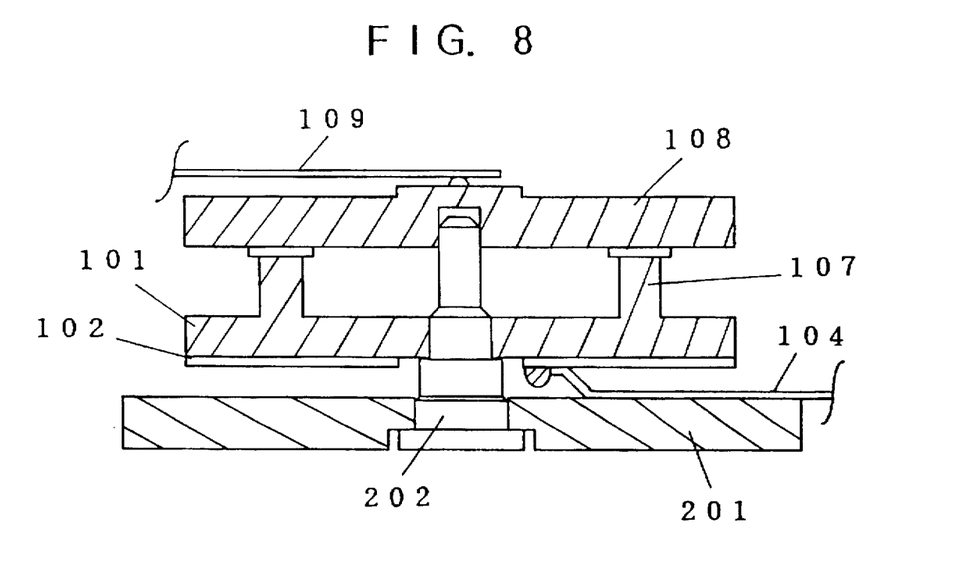
FIG. 8 is a sectional view of the ultrasonic motor device according to the present invention.

FIG. 8 is a longitudinal sectional view of the first embodiment of the ultrasonic motor device according to the present invention. A central shaft 202 is fixed to a fixing bed 201. The vibrating body 101 adhered with the piezo-electric element 102 is fixedly supported by the central shaft 202 in the vicinity of the central portion so as to unite with the fixing bed 201. The moving body 108 is rotation-guided by the central shaft 202, and contacts the vibrating body 101 through the protrusions 107 at a predetermined pressure by a pressing spring 109 which is fixedly supported to the outside (not shown) at one end thereof.

Figure 9:
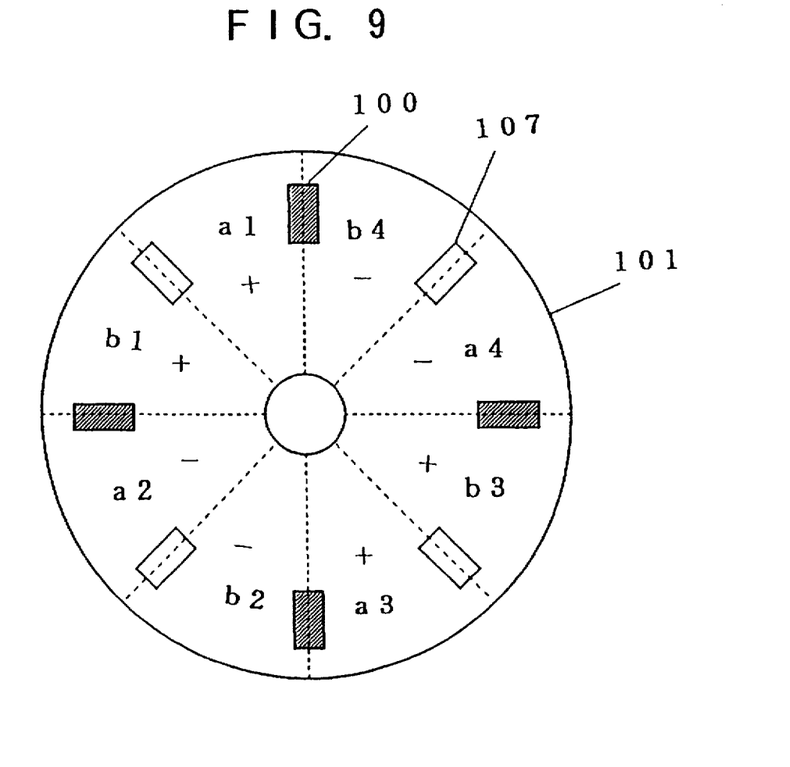
FIG. 9 is a second plan view of the vibrating body of the ultrasonic motor device according to the present invention.
Figure 10:
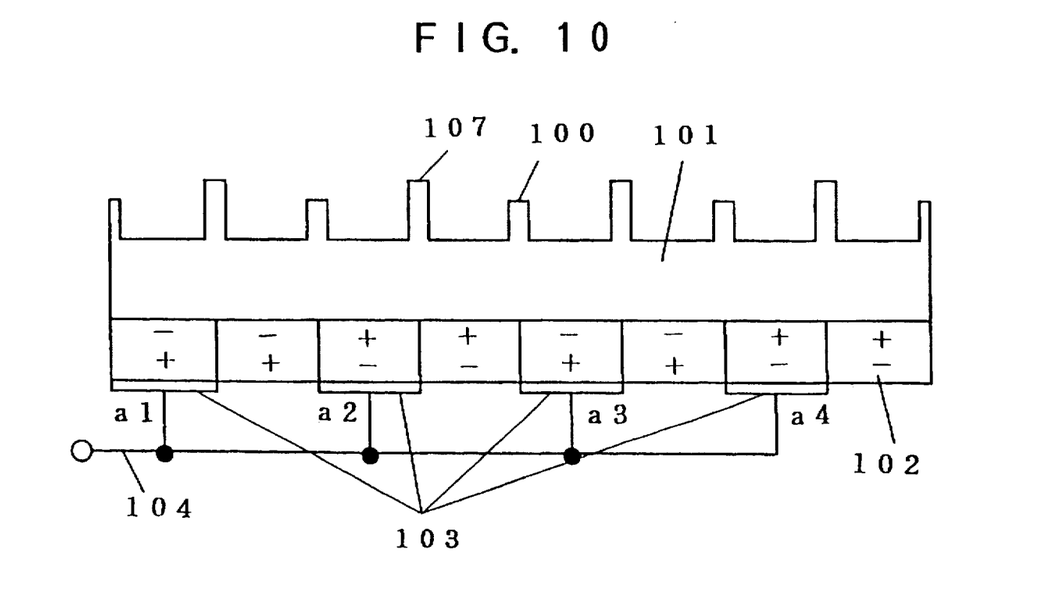
FIG. 10 is a second sectional view of the vibrating body of the ultrasonic motor device according to the present invention.

FIG. 9 and FIG. 10 are a plan view and a longitudinal sectional view of a second vibrating body of the ultrasonic motor device according to the present invention, respectively. Only the different points from those of the vibrating body of the first embodiment will be described. The same construction as those of the first embodiment can be applied to the construction of one set of the electrode group 103 formed on the one surface of the piezo-electric element 102.

Protrusions 107 which are identical in shape with the first embodiment for transmitting the power to one side portions of the respective fan-shaped electrodes, are disposed on the surface of the vibrating body 101, and protrusions 100, each of which is identical in shape with the protrusion 107 but is shorter than it, are disposed on the side portions of the respective electrodes except the portions at which the protrusions 107 are disposed. The protrusions 107 aim to transmit the power of the moving body 108, but the protrusions 100, each of which is identical in shape with the protrusion 107 but is shorter than it, do not transmit the power to the moving body 108. By this construction, a plurality of the protrusions can be arranged eventually with a satisfactory balance on the surface of the vibrating body 101, so that the short protrusions 100 contributes to the adjustment of the oscillation condition.

Besides, in the present embodiment, the short protrusions 100 which do not transmit the power to the moving body 108 but are disposed for adjusting the oscillation condition of the vibrating body 101 are arranged in the vicinity of the border of the electrodes between the respective protrusions 107, however, the even number such as three, five, etc., of the short protrusions may be arranged between the respective protrusions 107. Otherwise, arc-like protrusions each having a large width with respect to the circumferential direction are arranged between the respective protrusions 107.

Figure 11:
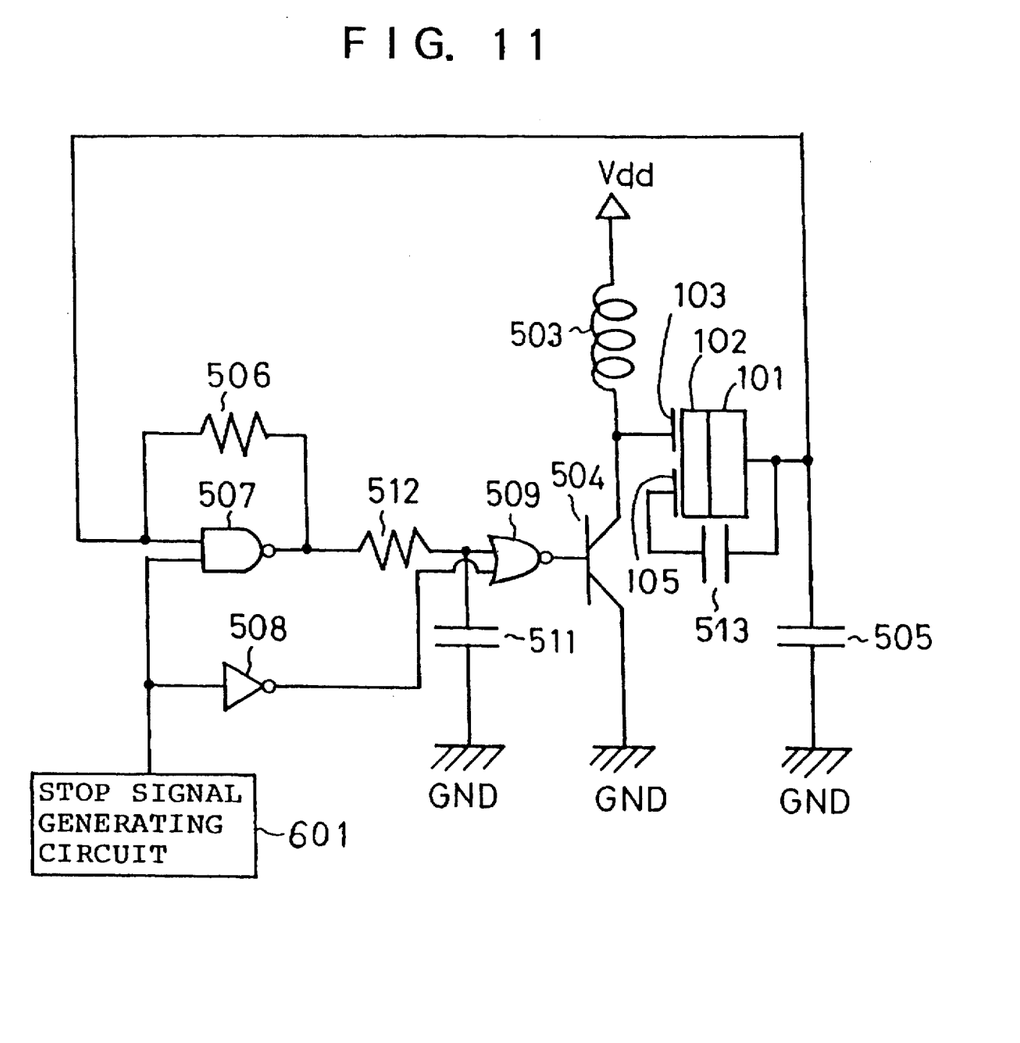
FIG. 11 is a third concrete circuit of an ultrasonic motor device according to the present invention.

FIG. 11 shows a concrete circuit construction of a third embodiment of an ultrasonic motor device according to the present invention. The basic circuit construction is the same as that of the second embodiment. However, two of the electrode groups 103, 105 are disposed on one surface of the ultrasonic motor, and then the signal which is boosted by the boosting circuit 501 is applied to the one electrode group 103. The other electrode group 105 and the oscillation body 101 are electrically coupled to each other by the condenser 513. The voltage which is excited on the electrode 103 by the oscillation of the vibrating body 101 is feedback-controlled to the vibrating body 101 by the condenser 103, so that the oscillation generated on the vibrating body 101 is controlled to thereby generate the comb-like leading end-like elliptic oscillation which is the optimal for rotating the moving body at a high speed.

As described above, in the present invention, the electrode group comprising a plurality of the electrodes is formed on the surface of the piezo-electric element, the electrode group is oscillating-driven by the boosting circuit, and there are provided the amplifying circuit for receiving the signal generated on the electrodes formed on the other surface of piezo-electric element to amplify the received signal, then outputting it to the boosting circuit, and the stop signal generating circuit for selecting the execution and the stoppage of the operation of the amplifying circuit, and the moving body is rotated by self-excited oscillation of the piezo-electric element.

Accordingly, there is obtained the effects that the driving system is simple, the environmental reliability is superior, and the voltage drive and the electric source consumption are low. Thus, the ultrasonic motor device according to the present invention can be driven by an electric source such as the battery, etc., and can be used as a driving source in a miniaturized electronic equipment such as a watch.

What is claimed is:

1. An ultrasonic motor device comprising:

a vibrating body to which a piezo-electric element is fixed;

a moving body movably disposed on the vibrating body and frictionally driven by ultrasonic vibration of the vibrating body;

pressing means for pressing the moving body into pressure contact with the vibrating body; and a self-excited vibration circuit having a piezo-electric element having a first surface and a second surface, at least one group of electrodes disposed on the first surface of the piezo-electric element, an amplifying circuit for receiving a voltage generated on the second surface of the piezo-electric element and amplifying the received voltage to a predetermined voltage level, and a boosting circuit for boosting an output voltage of the amplifying circuit and vibrationally driving the group of electrodes disposed on the first surface of the piezo-electric element.

2. An ultrasonic motor device as claimed in claim 1; wherein the boosting circuit comprises at least one boosting coil and at least one transistor.

3. An ultrasonic motor device as claimed in claim 1; wherein the self-excited vibration circuit has a filter circuit.

4. An ultrasonic motor device as claimed in claim 1; wherein the self-excited vibration circuit has a resonant circuit constituted by the vibrating body and a condenser.

5. An ultrasonic motor device as claimed in claim 1; further comprising a stop signal generating circuit for controlling the amplifying circuit to selectively execute and stop an amplifying function thereof.

6. An ultrasonic motor device as claimed in claim 1; wherein the first surface of the piezo-electric element is divided into an equal number of fan-shaped portions in a multiple of 4, every other fan-shaped portion defining one of the electrodes disposed on the first surface of the piezo-electric element, the fan-shaped electrodes being subjected to polarizing treatments having an alternately reversed direction of polarization; and wherein the vibrating body is fixed to the second surface of the piezo-electric element and has protrusions each disposed at one side of each of the fan-shaped electrodes for transmitting a driving power to the moving body.

7. An ultrasonic motor device as claimed in claim 1; wherein the self-excited vibration circuit has another group of electrodes disposed on the first surface of the piezo-electric element, one of the electrode groups being applied with a voltage generated by the boosting circuit, and the other of the electrode groups being coupled electrically to an electrode disposed on the second surface of the piezo-electric element through a condenser.

8. An ultrasonic motor device as claimed in claim 1; wherein the first surface of the piezo-electric element is divided into an equal number of fan-shaped portions in a multiple of 4, every other fan-shaped portion defining one of the electrodes disposed on the first surface of the piezo-electric element, the fan-shaped electrodes being subjected to polarizing treatments having an alternately reversed direction of polarization; and wherein the vibrating body is fixed to the second surface of the piezo-electric element and has protrusions each disposed at one side of each of the fan-shaped electrodes for transmitting a driving power to the moving body, and convex portions for adjusting an oscillating condition of the vibrating body, the convex portions having a length shorter than a length of the protrusions so as not to transmit a driving power to the moving body.

9. An ultrasonic motor device comprising:
   a piezo-electric element having a first surface and a second surface;
   at least one group of electrodes disposed on the first surface of the piezo-electric element;
   a vibrating member disposed on the second surface of and electrically connected to the piezo-electric element to be vibrationally driven thereby;
   a moving member movably disposed on the vibrating member and driven by vibration of the vibrating member;
   a pressure regulating member for urging the moving member into pressure contact with the vibrating member;
   an amplifying circuit for receiving a voltage generated on the second surface of the piezo-electric element and amplifying the received voltage to a predetermined voltage level; and
   a boosting circuit comprised of at least one boosting coil and at least one transistor for boosting the output voltage of the amplifying circuit and applying the boosted output voltage to the group of electrodes of the piezo-electric element to vibrationally drive the vibrating member.

10. An ultrasonic motor device as claimed in claim 9; further comprising a stop signal generating circuit for controlling the amplifying circuit to selectively execute and stop amplification of the received voltage.

11. An ultrasonic motor device as claimed in claim 9; wherein the group of electrodes comprises a plurality of fan-shaped electrodes disposed on the first surface of the piezo-electric element at equal intervals in a multiple of four, each pair of neighboring electrodes corresponding to a region of the piezo-electric element having an alternately reversed direction of polarization.

12. An ultrasonic motor device comprising:
   a piezo-electric element having a first surface and a second surface;
   at least one group of electrodes disposed on the first surface of the piezo-electric element;
   a vibrating member disposed on the second surface of and electrically connected to the piezo-electric element to be vibrationally driven thereby;
   a moving member movably disposed on the vibrating member and driven by vibration of the vibrating member;
   a pressure regulating member for urging the moving member into pressure contact with the vibrating member;
   an amplifying circuit for receiving a voltage generated on the second surface of the piezo-electric element and amplifying the received voltage to a predetermined voltage level;
   a stop signal generating circuit for controlling the amplifying circuit to selectively execute and stop amplification of the received voltage; and
   a boosting circuit for boosting the output voltage of the amplifying circuit and applying the boosted output voltage to the group of electrodes of the piezo-electric element to vibrationally drive the vibrating member.

13. An ultrasonic motor device as claimed in claim 12; wherein the group of electrodes comprises a plurality of fan-shaped electrodes disposed on the first surface of the piezo-electric element at equal intervals in a multiple of four, each pair of neighboring fan-shaped electrodes corresponding to a region of the piezo-electric element having an alternately reversed direction of polarization.

14. An ultrasonic motor device comprising:
   a piezo-electric element having a first surface and a second surface, the first surface being divided into an equal number of fan-shaped portions in a multiple of four;
   at least one group of electrodes disposed on the first surface of the piezo-electric element, every other fan-shaped portion disposed on the first surface of the piezo-electric element defining one of the electrodes, and each pair of neighboring fan-shaped electrodes corresponding to a region of the piezo-electric element having an alternately reversed direction of polarization;
   a vibrating member disposed on the second surface of and electrically connected to the piezo-electric element to be vibrationally driven thereby;
   a moving member movably disposed on the vibrating member and driven by vibration of the vibrating member;
   a pressure regulating member for urging the moving member into pressure contact with the vibrating member;
   an amplifying circuit for receiving a voltage generated on the second surface of the piezo-electric element and amplifying the received voltage to a predetermined voltage level;
   a boosting circuit for boosting the output voltage of the amplifying circuit and applying the boosted output voltage to the group of electrodes of the piezo-electric element to vibrationally drive the vibrating member; and
   a plurality of first protrusions disposed on the vibrating member for transmitting the vibrational drive of the electrodes to the moving member.

15. An ultrasonic motor device as claimed in claim 14; wherein the first protrusions are disposed near every other one of the boundaries of the electrodes.

16. An ultrasonic motor device as claimed in claim 15; further comprising a plurality of second protrusions disposed near every other one of the boundaries of the electrodes other than the boundaries of the electrodes where the first protrusions are disposed, the second protrusions having a length shorter than a length of the first electrodes so as to not transmit the vibrational drive of the electrodes to the moving member.

17. An ultrasonic motor device device comprising:

a piezo-electric element having a first surface and a second surface;

first and second groups of electrodes disposed on the first surface of the piezo-electric element;

a vibrating member disposed on the second surface of and electrically connected to the piezo-electric element to be vibrationally driven thereby;

a condenser for electrically connecting the first group of electrodes to the vibrating member;

a moving member movably disposed on the vibrating member and driven by vibration of the vibrating member;

a pressure regulating member for urging the moving member into pressure contact with the vibrating member;

an amplifying circuit for receiving a voltage generated on the second surface of the piezo-electric element and amplifying the received voltage to a predetermined voltage level; and a boosting circuit for boosting the output voltage of the amplifying circuit, applying the boosted output voltage to the second group of electrodes of the piezo-electric element to vibrationally drive the vibrating member.

18. An ultrasonic motor device comprising:

a vibrating member;

a moving member movably disposed on the vibrating member;

a pressure regulating member for urging the moving member into pressure contact with the vibrating member; and a self-excited vibration circuit having a piezo-electric element having a first surface supporting at least one group of electrodes and a second surface supporting the vibrating member, an amplifying circuit for receiving a voltage generated on the second surface of the piezo-electric element and amplifying the received voltage to a predetermined voltage level, and a boosting circuit for boosting an output voltage of the amplifying circuit and applying the boosted output voltage to the group of electrodes of the piezo-electric element to vibrationally drive the vibrating member.

19. An ultrasonic motor device as claimed in claim 18; further comprising a stop signal generating circuit for controlling the amplifying circuit to selectively execute and stop amplification of the received voltage.

20. An ultrasonic motor device as claimed in claim 18; wherein the group of electrodes comprises a plurality of fan-shaped electrodes disposed on the first surface of the piezo-electric element at equal intervals in a multiple of four, each pair of neighboring electrodes corresponding to a region of the piezo-electric element having an alternately reversed direction of polarization.

21. An ultrasonic motor device as claimed in claim 18; wherein the self-excited vibration circuit has a filter circuit.

22. An ultrasonic motor device as claimed in claim 18; wherein the boosting circuit comprises at least one boosting coil and at least one transistor.

* * * * *